United States Patent
Philipson (10) Patent No.: US 10,371,555 B2
(45) Date of Patent: Aug. 6, 2019

(54) CAPACITIVE CONTINUOUS FLUID LEVEL SENSOR

(71) Applicant: TOUCHSENSOR TECHNOLOGIES, LLC, Wheaton, IL (US)

(72) Inventor: Randall Philipson, Naperville, IL (US)

(73) Assignee: TOUCHSENSOR TECHNOLOGIES, LLC, Wheaton, IL (US)

( * ) Notice: Subject to any disclaimer, the term of this patent is extended or adjusted under 35 U.S.C. 154(b) by 140 days.

(21) Appl. No.: 15/655,444

(22) Filed: Jul. 20, 2017

(65) Prior Publication Data

US 2018/0023993 A1 Jan. 25, 2018

Related U.S. Application Data

(60) Provisional application No. 62/364,946, filed on Jul. 21, 2016.

(51) Int. Cl.
*G01F 23/26* (2006.01)
*D06F 39/08* (2006.01)

(52) U.S. Cl.
CPC .......... *G01F 23/268* (2013.01); *G01F 23/265* (2013.01); *G01F 23/266* (2013.01); *D06F 39/087* (2013.01)

(58) Field of Classification Search
CPC ..... G01F 23/265; G01F 23/266; G01F 23/268
See application file for complete search history.

(56) References Cited

U.S. PATENT DOCUMENTS

| | | | | |
|---|---|---|---|---|
| 4,637,254 A | * | 1/1987 | Dyben | G01F 23/76 340/624 |
| 7,017,409 B2 | * | 3/2006 | Zielinski | G01F 23/261 73/290 R |
| 7,373,817 B2 | * | 5/2008 | Burdi | F04D 15/0218 340/620 |
| 8,024,967 B2 | | 9/2011 | Burdi et al. | |
| 9,476,750 B2 | * | 10/2016 | White | A47J 31/4457 |
| 9,476,752 B2 | * | 10/2016 | Vilag | B67D 7/3272 |
| 9,678,053 B2 | * | 6/2017 | Kato | G01N 33/2852 |
| 2002/0129650 A1 | * | 9/2002 | Zimmermann | G01F 15/022 73/295 |
| 2004/0209153 A1 | * | 10/2004 | Peled | H01M 4/8605 429/414 |
| 2009/0165552 A1 | * | 7/2009 | Sieh | G01F 23/265 73/304 C |
| 2009/0301188 A1 | * | 12/2009 | Calcote | G01F 23/265 73/304 C |
| 2010/0126268 A1 | | 5/2010 | Baily et al. | |
| 2011/0036164 A1 | | 2/2011 | Burdi | |
| 2011/0128154 A1 | | 6/2011 | Herrema et al. | |

(Continued)

OTHER PUBLICATIONS

Wang, "TI Designs: Capacitive-Based Liquid Level Sensing Sensor Reference Design," TIDU736A, pp. 1-23, (Mar. 2015).

(Continued)

*Primary Examiner* — Francis C Gray
(74) *Attorney, Agent, or Firm* — Barnes & Thornburg LLP (57) ABSTRACT

A fluid level sensor includes fluid sensing electrodes, reference electrodes, and a controller. The reference electrodes compensate for temperature fluctuations about the fluid electrodes. The controller determines fluid level based on the response of the fluid electrodes to the presence of the fluid in proximity thereto.

17 Claims, 5 Drawing Sheets

(56) References Cited

U.S. PATENT DOCUMENTS

2015/0129039 A1  5/2015  Mulvaney
2016/0004361 A1* 1/2016  Maharyta ................ G06F 3/044
                                                  345/174

OTHER PUBLICATIONS

Search Report issued in Int'l Appl. No. PCT/US2017/043105 (2017).

* cited by examiner

CAPACITIVE CONTINUOUS FLUID LEVEL SENSOR

CROSS-REFERENCE TO RELATED APPLICATION

This application claims benefit under 35 U.S.C. § 119 of U.S. Provisional Patent Application No. 62/364,946, filed on Jul. 21, 2016, and incorporates herein the disclosure thereof in its entirety.

BACKGROUND AND SUMMARY OF THE DISCLOSURE

Capacitive sensors can be used to detect the proximity of a fluid, for example, water or another liquid. An arrangement of capacitive sensors disposed in or on a sidewall of a vessel can be used to detect the presence and level of fluid within the vessel.

DETAILED DESCRIPTION OF THE ILLUSTRATED EMBODIMENTS

Figure 1:
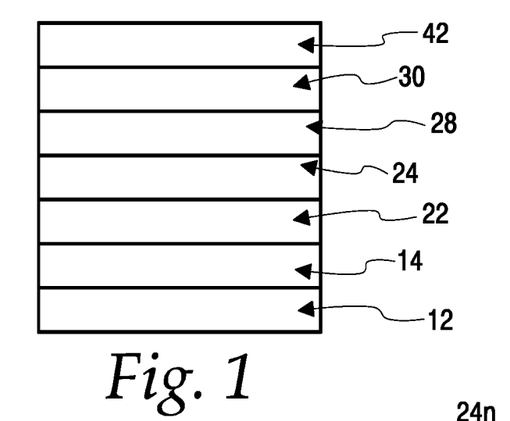
FIG. 1 is a side elevation view of a capacitive continuous fluid level sensor electrode structure according to the present disclosure.
Figure 2:
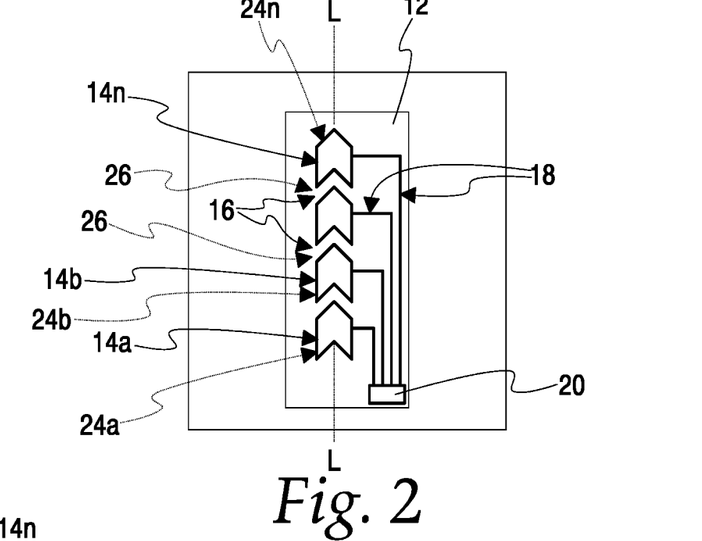
FIG. 2 is a top plan view of a portion of a capacitive continuous fluid level sensor electrode structure according to the present disclosure.
Figure 3:
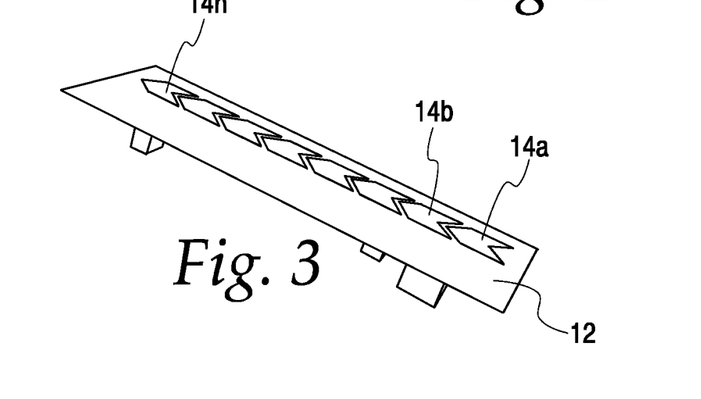
FIG. 3 is a perspective view of a capacitive continuous fluid level sensor structure according to the present disclosure.

FIGS. 1-3 show an embodiment of a capacitive continuous level sensor electrode structure 10 according to the present disclosure. The structure 10 includes a dielectric substrate 12. The substrate 12 may be flexible or rigid. For example, the substrate 12 may be a flexible circuit carrier made of polyester or another suitable material, or a printed wiring board made of FR4 or another suitable material.

A first plurality of sensing electrodes 14a-14n is disposed on a first side of the substrate 12. Each electrode of the first plurality of sensing electrodes 14a-14n (where n is a variable) (sometimes referred to herein individually or collectively as the first electrodes (14) or the fluid electrodes (14)) is shown as a thin conductive electrode pad. The first electrodes 14 are shown as being arranged in a substantially linear array or orientation. In another embodiment, the first electrodes 14 could be arranged in another form of array or orientation. Each of the first electrodes 14 is shown as chevron-shaped. In other embodiments, the first electrodes 14 could have other shapes. For example, each of the first electrodes 14 could be shaped as a rhombus, a square, another polygonal figure or a curvilinear figure.

A first space 16 is defined between adjacent pairs of the first electrodes 14. In an embodiment, the first electrodes 14 and the first spaces 16 are configured so that any and every straight line perpendicular to a longitudinal axis L of the array of first electrodes 14 intersects at least one of the first electrodes 14.

A plurality of first electrical traces 18 disposed on the substrate 12 connects respective ones of the first electrodes 14 to a first connection point or connector 20 disposed on or otherwise associated with the substrate 12.

A first dielectric layer 22 is disposed on and overlies the first electrodes 14 and may overlie the first traces 16. As such, the first electrodes 14 and first traces 16 may be deemed to be disposed on the first dielectric layer 22, as well as on the substrate 12.

A second plurality of sensing electrodes 24a-24n (sometimes referred to herein individually or collectively as the second electrodes (24) or the reference electrodes (24)) is disposed on the first dielectric layer 22 in substantial registration with the first electrodes 14. That is, each individual electrode 24a-24n of the second electrodes 24 overlies a corresponding one of the individual electrodes 14a-14n of the first electrodes 14 in substantial registration therewith. Each of the second electrodes 24 may be, but need not be, configured in a manner substantially identical to the first electrodes 14. In an embodiment, the second electrodes 24 may have a form similar to, but somewhat smaller than the corresponding first electrodes 14. Such a configuration allows the first electrodes 14 to function as driven shields with respect to the second electrodes 24, as will be discussed further below.

A second space 26 is defined between adjacent pairs of the second electrodes 24. In an embodiment, the second electrodes 24 and the second spaces 26 are configured so that any and every straight line perpendicular to a longitudinal axis LL of the array of second electrodes 24 intersects at least one of the second electrodes 24. The longitudinal axis LL may, but need not, coincide with the longitudinal axis L.

A plurality of second electrical traces (not shown) disposed on the first dielectric layer 22 connects respective ones of the second electrodes 24 to a second connection point or connector (not shown) disposed on or otherwise associated with the first dielectric layer. The second electrical traces (not shown) and the second connection point (not shown) may be analogous to the first electrical traces 18 and the first connection point or connector 20.

A second dielectric layer 28 is disposed on and overlies the shield electrode 18. As such, the second electrodes 24 and the second traces (not shown) may be deemed to be disposed on the second dielectric layer 28, as well as on the first dielectric layer 22.

An electrically-driven shield electrode 30 is disposed on the second dielectric layer 28 and overlies the first electrodes 14 and the second electrodes 24. The shield electrode 30 may be configured, for example, as a conductive electrode mesh or grid. One or more shield traces (not shown) may be disposed on the second dielectric layer 28 and may connect the shield electrode 30 to a shield connection point or connector (not shown) disposed on or otherwise associated with the first dielectric layer 22. The shield traces (not shown) and the shield connection point or connector (not shown) may be similar to the first electrical traces 18 and the first connection point or connector 20.

A third dielectric layer 42 may be disposed on and may overlie the shield electrode 30. As such, the shield electrode 30 and the shield traces (not shown) may be deemed to be disposed on the third dielectric layer 42, as well as on the second dielectric layer 30. The third dielectric layer may bear other components, as well, for example a controller 44 or components thereof as will be discussed further below.

Figure 4:
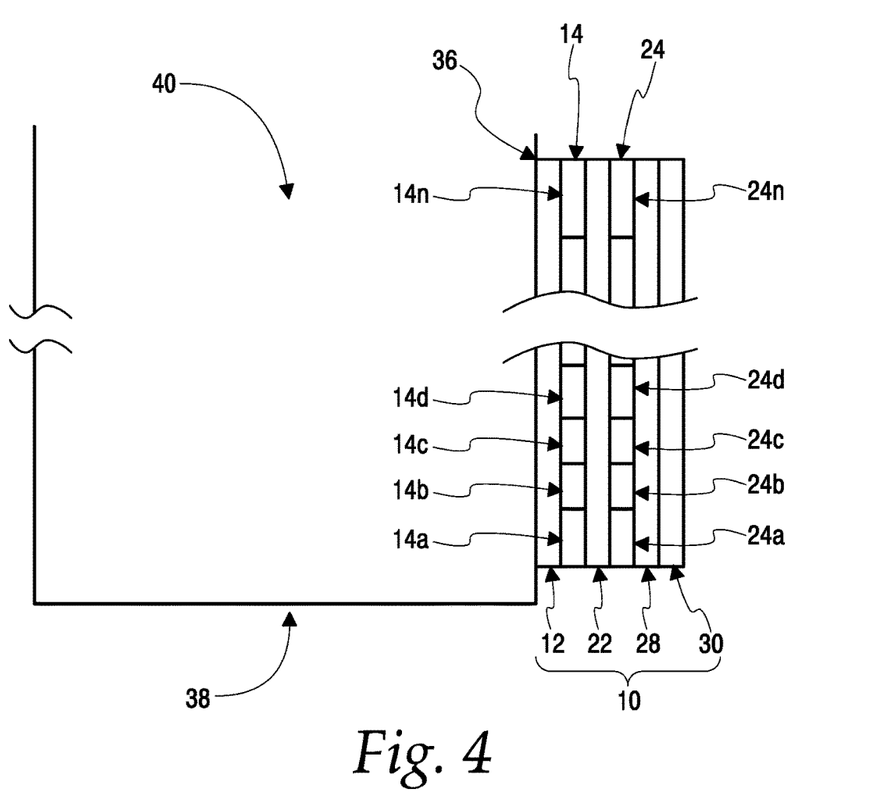
FIG. 4 is a cross-sectional side elevation view of a capacitive continuous fluid level sensor electrode structure according to the present disclosure applied to a side wall of a vessel.

The structure 10 may be applied to an outer surface of a wall 36, for example a side wall, of a vessel 38 defining an interior volume 40. More specifically, a second side of the substrate 12 may be applied to the wall 36 using an adhesive or another suitable attachment mechanism (not shown).

In an embodiment, the substrate 12 may be omitted and the balance of the structure 10 may be applied to the wall 36 with the first electrodes 14 facing the wall 36 and the interior volume 40 and the second electrodes 24 facing away from the wall and the interior volume. In such an embodiment, the surface of the wall 36 must be made of a dielectric material or a dielectric layer (not shown) must be disposed between the wall and the first electrodes 14.

FIG. 3 shows an illustrative capacitive continuous level sensor electrode structure 10 wherein the fluid electrodes 14 are visible on or through the visible surface thereof.

In another embodiment, the structure 10 with or without the substrate 12 may be embedded in the wall 36 of the vessel 38 with the first electrodes 14 facing the interior volume 40 and the second electrodes 24 facing away from the interior volume.

In a further embodiment, a portion of the structure 10 could be disposed on the outer surface of the wall 36 and another portion of the structure could be embedded in the wall. In such an embodiment, the wall 36 could comprise one of the first and second dielectric layers 22, 28. Typically, the electrode structure 10 would be associated with the wall 36 such that the arrays of fluid and reference electrodes 14, 24 are oriented vertically or with a vertical component. That is, the electrode structure 10 could be associated with the wall 36 such that the arrays of fluid and reference electrodes 14, 24 are oriented diagonally with respect to the vertical.

Each of the first (or fluid) electrodes 14, the second (or reference) electrodes 24, and the shield electrode 30, may be electrically connected to a controller 44. The controller 44 may be disposed on the structure 10 or located remotely therefrom. The controller may include a processor (not shown).

The controller 44 is configured to selectively sample each of the fluid electrodes 14 by energizing the respective fluid electrodes and detecting the capacitance thereof (sometimes referred to herein as the fluid capacitances). The controller 44 also is configured to selectively sample each of the reference electrodes 24 by energizing the respective reference electrodes and sampling the capacitance thereof (sometimes referred to herein as the reference capacitances). When sampling the reference electrodes 24, the controller 44 may simultaneously or substantially simultaneously energize the fluid electrodes 14, causing the fluid electrodes to act as a driven shield that substantially isolates the reference electrodes from a fluid F (typically a liquid) that might be within the vessel 36. The controller 44 further is configured to selectively energize the shield electrode 30 when sampling the fluid and reference, thereby electrically isolating the fluid electrodes 14 and the reference electrodes 24 from the environment about the vessel 38 to which the structure 10 might be attached.

As set forth above, the controller 44 selectively energizes each of the fluid electrodes 14 and detects the capacitances of each of the fluid electrodes (the fluid capacitances). Also, the controller 44 selectively energizes each of the reference electrodes 30 and detects the capacitances of each of the reference electrodes 24 (the reference capacitances). The controller 44 may detect the foregoing capacitances in terms of any suitable unit, for example, in terms of raw counts.

The controller 44 repeatedly determines the difference between the fluid capacitances and the reference capacitances by subtracting the capacitance of each of the reference electrodes 24 from the capacitance of each of the corresponding fluid electrodes 14. For example, the processor determines the difference between the capacitance of reference electrode 24a and the capacitance of fluid electrode 14a by subtracting the capacitance of reference electrode 24a from the capacitance of fluid electrode 14a. Similarly, the processor determines the difference between the capacitance at reference electrode 24b and the capacitance at fluid electrode 14b by subtracting the capacitance at reference electrode 24b from the capacitance at fluid electrode 14b, and so on, for each corresponding pair of fluid electrodes 14 and reference electrodes 24.

The fluid capacitances may be affected by temperature fluctuations about the fluid electrodes 14. For example, the vessel 38 containing the fluid F to be measured may be located in an environment having an ambient temperature. The fluid F to be measured may be substantially warmer or cooler than the ambient temperature. As the level of the fluid F rises and falls within the vessel 38, the temperature of the fluid electrodes 14 may change in response to heat transfer between the fluid and the fluid electrodes. The temperature changes may affect the fluid capacitance and, therefore, the accuracy of the level measurements obtained thereby.

Because the reference electrodes 24 are physically proximate the fluid electrodes 14, the foregoing temperature fluctuations affect the fluid electrodes 12 and the reference electrodes 24 substantially equally. Also, because the reference electrodes 24 are electrically shielded by the fluid electrodes 14 when the reference electrodes are sampled, the reference electrodes are not otherwise substantially affected by the presence or absence of the fluid F in proximity thereto. As such, basing the measurement level determination discussed further below on the differences between the fluid capacitances and the reference capacitances essentially nullifies the effects of temperature on the fluid electrodes 14.

Figure 5:
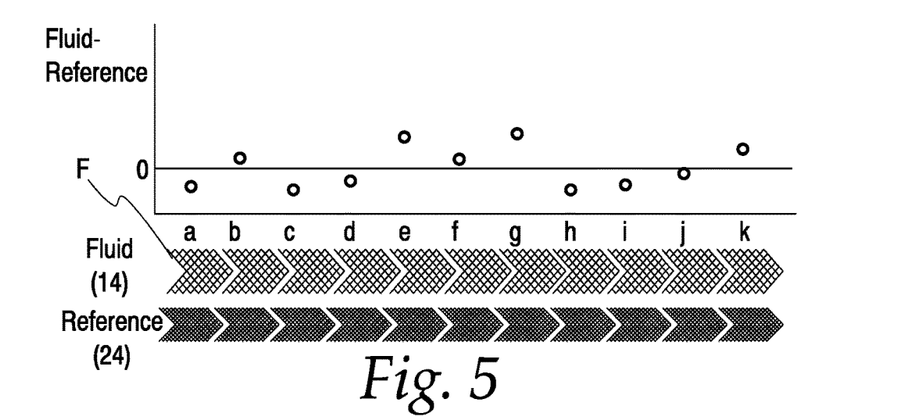
FIG. 5 is a graph showing illustrative differences between capacitances measured at ones of a first array of sensing electrodes and capacitances measured at corresponding ones of a second array of sensing electrodes of a capacitive continuous fluid level sensor according to the present disclosure prior to calibration thereof.

FIG. 5 shows graphically illustrative differences between the fluid capacitance and the reference capacitance for each corresponding pair of fluid electrodes 14 and reference electrodes 24 in the absence of a fluid proximate the fluid electrodes 14 and prior to calibration of the electrode structure 10 and the controller 44. FIG. 4 shows that the differences vary about a baseline of about zero counts.

Figure 6:
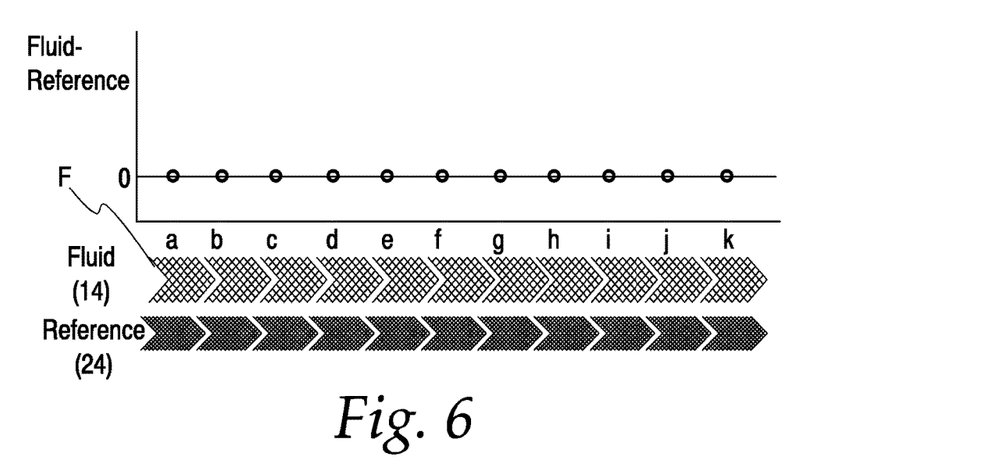
FIG. 6 is a graph showing illustrative differences between capacitances measured at ones of a first array of sensing electrodes and capacitances measured at corresponding ones of a second array of sensing electrodes of a capacitive continuous fluid level sensor according to the present disclosure following calibration thereof.

The controller 44 may conduct a calibration whereby the controller sets the difference between the fluid capacitances and the reference capacitances at a baseline of, for example, about zero counts. The controller 44 may do so by mathematically offsetting the fluid and/or reference capacitances at so that the difference there between is zero counts (or another desired baseline figure). For example, if a particular fluid capacitance is x counts and the corresponding reference capacitance is y counts such that the difference between the fluid capacitance and the reference capacitance is z counts, the controller 44 may mathematically offset the measured fluid capacitance or the measured reference capacitance by z counts to yield a calculated difference there between of zero counts. The calibration could be performed at startup of the sensor apparatus or from time to time. FIG. 6 shows graphically illustrative differences between the fluid capacitance and the reference capacitance for each corresponding pair of fluid electrodes 14 and reference electrodes 24 in the absence of a fluid proximate the fluid electrodes 14 following such a calibration of the electrode structure 10 and the controller 44. In an embodiment, the calibration could be omitted or a null calibration could be performed (whereby the baseline is achieved without any offset as discussed above).

The presence of fluid proximate any of the fluid electrodes 14 affects the capacitance at the respective fluid electrodes 14, causing the capacitance there to change. The controller 44 responds to such changes in capacitance. With the electrode structure 10 associated with the side wall 36 of the vessel 38, the controller 44 uses such changes in capacitance to provide an output indicative of the level of a fluid within the interior volume 40 of the vessel.

For example, with no fluid in the vessel 38, no fluid is proximate any of the first electrodes 14 or any portion thereof. As such, no portion of any of the first electrodes 14 is submerged by (as used herein, the term "submerged" refers to the presence of fluid proximate a structure, for example, one of the fluid electrodes 14, and does not imply that the structure is immersed in and wetted by the fluid) or otherwise affected by the presence or proximity of a fluid.

Figure 7:
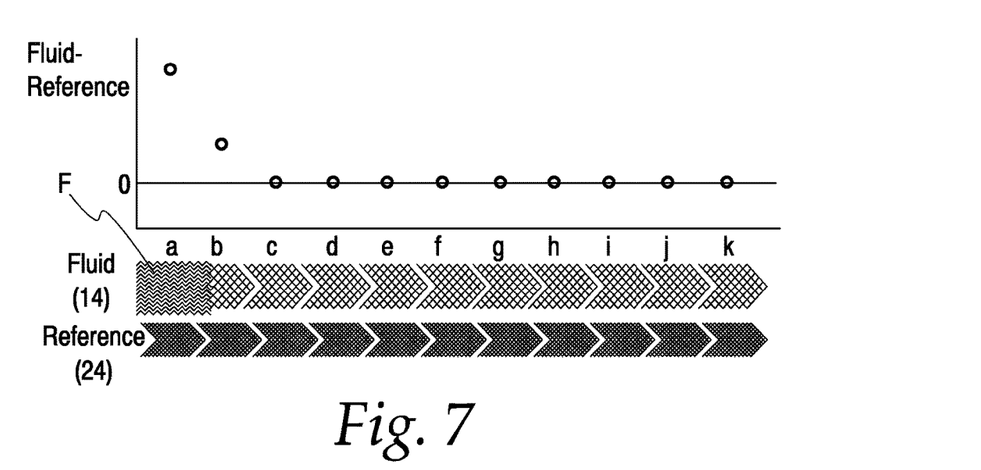
FIG. 7 is a graph showing illustrative differences between capacitances measured at ones of a first array of sensing electrodes and capacitances measured at corresponding ones of a second array of sensing electrodes of a calibrated capacitive continuous fluid level sensor according to the present disclosure with a first electrode of the first array of sensing electrodes "submerged" in a fluid.

As fluid is added to the vessel 38, a lower portion of the lowest fluid electrode 14a becomes submerged by the fluid. The capacitance about this electrode begins to change based on the proximity of the fluid. As more fluid is added to the vessel 38 and the fluid level in the vessel rises, the fluid eventually completely submerges the lowest fluid electrode 14a and a lower portion of the second lowest fluid electrode 14b becomes submerged by the fluid. An illustrative response to this situation is shown graphically in FIG. 7. More specifically, FIG. 7 shows the capacitance difference between the lowest pair of fluid and reference electrodes 14a, 24a having reached a peak because the fluid electrode 14a is fully submerged. FIG. 7 also shows the capacitance difference between the second lowest pair of fluid and reference electrodes 14b, 24b increasing from the baseline of zero because the fluid electrode 14b is partially submerged.

A significant increase in the capacitance difference between the second lowest pair of fluid and reference electrodes 14b, 24b from the baseline of zero is indicative of the lowest fluid electrode 14a being fully submerged by the fluid and of the capacitance difference between the lowest pair of fluid and reference electrodes 14a, 24a having reached a peak. The peak may be dependent upon the dielectric properties of the particular fluid being detected in the vessel.

Figure 8:
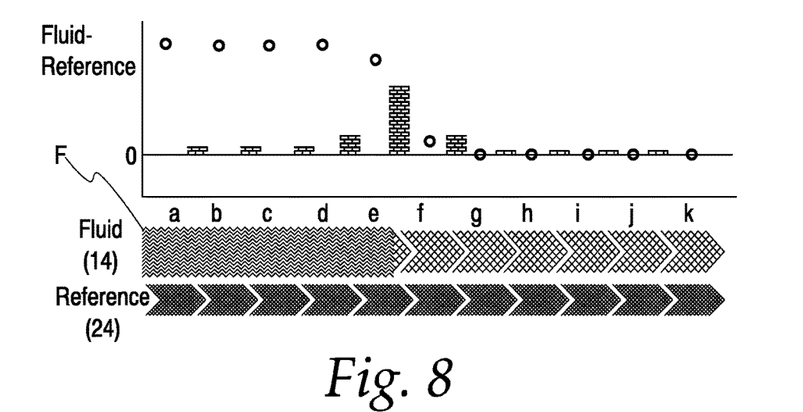
FIG. 8 is a graph showing illustrative differences between capacitances measured at ones of a first array of sensing electrodes and capacitances measured at corresponding ones of a second array of sensing electrodes of a calibrated capacitive continuous fluid level sensor according to the present disclosure with first through fourth electrodes of the first array of sensing electrodes "submerged" in a fluid.

As still more fluid is added to the vessel 38 and the fluid level in the vessel rises further, fluid eventually completely submerges the second lowest fluid electrode 14b, and a lower portion of the third lowest fluid electrode 14c becomes submerged by the fluid. As further fluid is added to the vessel 38, thereby further elevating the fluid level in the vessel, additional fluid electrodes 14 may eventually become partially and then fully submerged. An illustrative response to a situation wherein the four lowest fluid electrodes 14a, 14b, 14c, 14d are fully submerged and the fifth lowest fluid electrode 14e is partially submerged is shown graphically in FIG. 8. More specifically, FIG. 8 shows the capacitance differences between each of the four lowest pairs of fluid and reference electrodes 14a-14d, 24a-24d having reached peaks because the fluid electrodes 14a-14d are fully submerged. FIG. 8 also shows the capacitance difference between the fifth lowest pair of fluid and reference electrodes 14e, 24e increasing from the baseline of zero because the fifth lowest fluid electrode 14e is partially submerged.

The peak capacitance differences between each of the four lowest pairs of fluid and reference electrodes 14a-14d, 24a-24d are shown as substantially identical, but they could vary by some substantially inconsequential amount. The degree of variation among the peak capacitance differences of the various pairs of fluid and reference electrodes 14n and 24n may be a function of the electrode sampling circuitry and variations in the respective electrode shapes and sizes. As such, greater precision in the overall configuration of the structure 10, including size, shape and spacing of the various pairs of fluid and reference electrodes 14n and 24n may yield greater precision in the measurements obtained thereby.

FIG. 8 also shows a non-zero capacitance difference between the fifth lowest pair of fluid and reference electrodes 14f, 24f. This phenomenon is the result of the fluid being sufficiently proximate the fifth lowest fluid electrode 14f to affect the capacitance there, even though the fluid submerges no part of the fifth lowest fluid electrode 14f.

Figure 9:
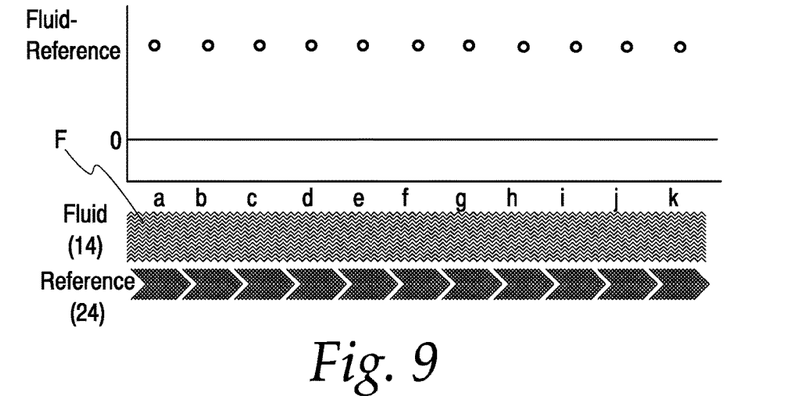
FIG. 9 is a graph showing illustrative differences between capacitances measured at ones of a first array of sensing electrodes and capacitances measured at corresponding ones of a second array of sensing electrodes of a calibrated capacitive continuous fluid level sensor according to the present disclosure with all of the electrodes of the first array of sensing electrodes "submerged" in a fluid.

FIG. 9 shows an illustrative response to a situation wherein all of the fluid electrodes 14 are fully submerged.

More specifically, FIG. 9 shows the capacitance differences between each of the pairs of fluid and reference electrodes 14a-14k, 24a-24k having reached peaks because the fluid electrodes 14a-14k are fully submerged.

In situations wherein a particular fluid electrode 14 is partially submerged, the system can interpolate the level of the fluid with respect to that fluid electrode. More specifically, the system can calculate the slope of the curve connecting the capacitance differences at particular pairs of fluid and reference electrodes 14, 24, and the system can use the slope data to determine the level of the fluid with respect to the respective fluid electrode 14.

For example, FIG. 8 depicts a situation wherein fluid electrodes 14a-14d are fully submerged, fluid electrode 14e is partially submerged, and the fluid level is sufficiently near fluid electrode 14f to provoke a response there. The slope of the curve is zero from fluid electrode 14a through fluid electrode 14d. The slope of the curve then goes negative and becomes increasingly negative from fluid electrode 14d to fluid electrode 14f. The absolute value of the negative slope reaches a maximum about midway between fluid electrodes 14e and 14f. The slope of the curve then becomes decreasingly negative until it flattens out at zero at fluid electrode 14d. In FIG. 8, the slope is represented by the bar graph (more accurately, the inverse of the slope is represented by the bar graph).

The inflection point of the foregoing curve approximately corresponds to the level of the fluid F with respect to the fluid electrode 14e. The controller 44 can more precisely determine the fluid level with respect to fluid electrode 14e by determining the centroid of the area under the foregoing curve bounded by the points on opposite sides of the inflection point where the slope transitions to and from zero (that is, the points corresponding to the locations of fluid electrodes 14d and 14g, respectively). The component of the centroid corresponding to the fluid electrode 14 locations (the horizontal axis of FIG. 8) represents the level of the fluid F with respect to the fluid electrode 14e. The same methodology may be applied to determine the level of the fluid F with respect to any other partially submerged fluid electrode 14.

Figure 10:
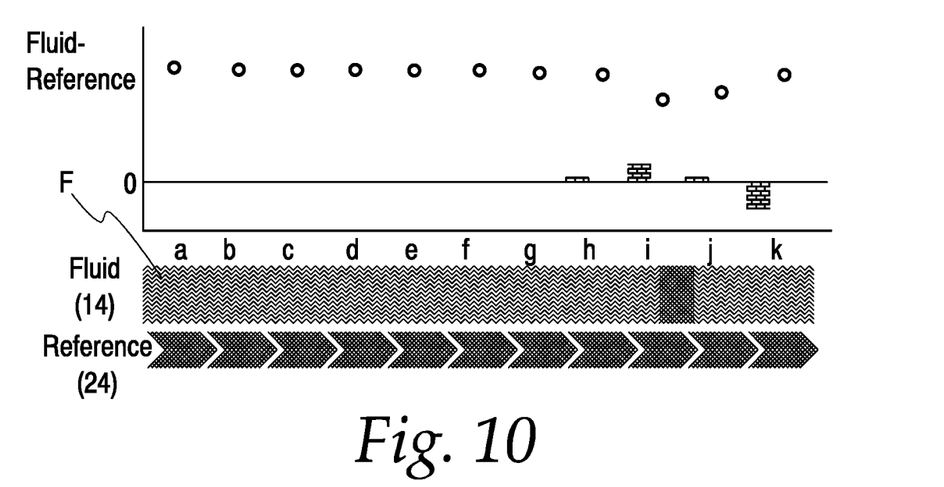
FIG. 10 is a graph showing illustrative differences between capacitances measured at ones of a first array of sensing electrodes and capacitances measured at corresponding ones of a second array of sensing electrodes of a calibrated capacitive continuous fluid level sensor according to the present disclosure with all of the electrodes of the first array of sensing electrodes "submerged" in a fluid and a build-up of contaminants proximate an adjacent pair of the electrodes.

Also, the controller 44 can use the slope of the foregoing curve to detect build-up of crud or contaminants on the side wall 36 of the vessel 38 proximate ones of the fluid electrodes 14. FIG. 10 depicts a situation wherein the capacitance differences between each of the pairs of fluid and reference electrodes 14a-14h, 24a-24h and between fluid and reference electrodes 14k, 24k have reached peaks because the fluid electrodes 14a-14k are fully submerged, but the capacitance differences between fluid and reference electrodes 14i-14j, 24i-24j are less than the peaks. This output is indicative of a build-up or crud or contaminants proximate fluid and reference electrodes 14i-14j, 24i-24j (which crud is represented by the darkened region on the representation of the fluid electrode 14 array in FIG. 10). The controller 44 could be configured to output an alarm advising the user of potential build-up or crud or contaminants proximate the affected electrodes or the sensor generally and/or prompting the user to clean the sensor and/or vessel wall.

Alternatively, the controller 44 can determine the fluid level using the formula:

$$\text{Level (in Percent)} = \frac{(Avg_{Fluid} - Avg_{Sensor}) * 100}{(Avg_{Fluid} - Avg_{no\text{-}fluid})}$$

where $Avg_{fluid}$=Average capacitance of fluid electrode 14a and fluid electrodes exhibiting peak capacitance or near-peak capacitance;

$Avg_{sensor}$=Average capacitance of fluid electrodes 14; and $Avg_{no\text{-}fluid}$=Average capacitance of fluid electrode 14a and fluid electrodes exhibiting baseline capacitance or near-baseline capacitance.

Figure 11:
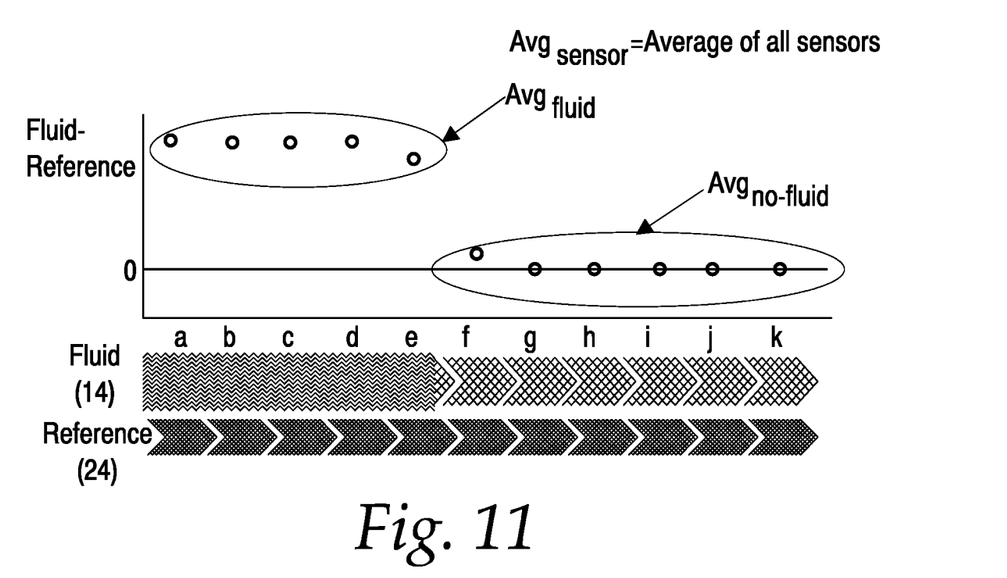
FIG. 11 is a graph showing illustrative differences between capacitances measured at ones of a first array of sensing electrodes and capacitances measured at corresponding ones of a second array of sensing electrodes of a calibrated capacitive continuous fluid level sensor according to the present disclosure with first through fourth electrodes of the first array of sensing electrodes "submerged" in a fluid, a fifth of the first array of sensing electrodes partially and nearly fully "submerged" in the fluid, a sixth of the first array of sensing electrodes partially "submerged" and nearly "unsubmerged" in the fluid, and seventh through eleventh of the first array of sensing electrodes "unsubmerged" in the fluid.

For example, FIG. 11 depicts a situation wherein fluid electrodes 14a-14d are fully submerged, fluid electrode 14e is partially submerged, the fluid level is sufficiently near fluid electrode 14f to provoke a response there, and fluid electrodes 14a-14d are not submerged. Each of fluid electrodes 14a-14d exhibits peak capacitance (indicative of them being fully submerged), fluid electrode 14e exhibits near-peak capacitance (indicative of it being partially and nearly fully submerged), fluid electrode 14f exhibits near-baseline capacitance (indicative of it being sufficiently submerged to provoke a response), and fluid electrodes 14g-14k exhibit baseline capacitance (indicative of them being not submerged). The level may be calculated as a function of a percentage of the distance between the fluid electrode at one end of the array of fluid electrodes (for example, fluid electrode 14a) and the fluid electrode at one end of the array of fluid electrodes 14 (for example, fluid electrode 14k) by subtracting the average capacitance of the fluid electrodes 14a-14k from the average of the capacitances of fluid electrodes 14a-14e and dividing the difference by the average capacitance of fluid electrodes 14a-14e minus the average capacitance of fluid electrodes 14f-14k. The foregoing distance may be representative of the level of fluid in a vessel with which the electrode structure 10 is associated.

In an embodiment, the reference electrodes 24 could be omitted and reference capacitors (not shown), each having a predetermined reference capacitance, could be provided in lieu of the respective reference electrodes. Such reference capacitors (not shown) could be located proximate the respective fluid electrodes 14. In another embodiment, a single reference capacitor having a reference capacitance could be provided in lieu of the reference sensors 24. In such an embodiment, the single reference capacitor could be located proximate any of the fluid electrodes 14 or the electrode structure 10 generally. In embodiments including reference capacitors in lieu of reference electrodes 24, the controller 44 could determine the foregoing capacitance differences by calculating the difference between the fluid capacitances and the corresponding reference capacitances (or the difference between the fluid capacitances and the reference capacitance of the single reference capacitor).

In another embodiment, the reference electrodes 24 could be omitted and reference thermistors (not shown), each having a predetermined response to temperature, could be provided in lieu of the respective reference electrodes. Such reference thermistors (not shown) could be located proximate the respective fluid electrodes 14. In another embodiment, a single reference thermistor having a reference response to temperature could be provided in lieu of the reference sensors 24. In such an embodiment, the single reference thermistor could be located proximate any of the fluid electrodes 14 or the structure 10 generally. In embodiments including reference thermistors in lieu of reference electrodes 24, the controller 44 could determine the foregoing capacitance differences by calculating the difference between the fluid capacitances and capacitances related to the corresponding reference thermistor outputs (or the difference between the fluid capacitances and a capacitance related to the single reference thermistor output).

The invention claimed is:

1. An apparatus for determining the level of a liquid in a vessel comprising a wall and an interior volume, the apparatus comprising;
   a first plurality of sensing electrodes disposable on or within the wall of the vessel;
   a second plurality of sensing electrodes overlying the first plurality of sensing electrodes and separated therefrom by an intervening dielectric material, each sensing electrode of the second plurality of sensing electrodes overlying and corresponding to a respective one of the first plurality of sensing electrodes;
   a shield electrode overlying the second plurality of sensing electrodes; and
   a controller electrically connected to each of the first plurality of sensing electrodes, to each of the second plurality of sensing electrodes, and to the shield electrode, the controller configured to:
      periodically energize the first plurality of sensing electrodes;
      periodically energize the second plurality of sensing electrodes;
      periodically energize the shield electrode;
      periodically determine first capacitances at respective ones of the first plurality of sensing electrodes;
      periodically determine second capacitances at corresponding respective ones of the second plurality of sensing electrodes;
      periodically calculate differences between the first and second capacitances; and output a signal indicative of the presence or absence of a liquid proximate the respective ones of the first plurality of sensing electrodes and the corresponding respective ones of the second plurality of sensing electrodes based on the differences.

2. The apparatus of claim 1 wherein the controller is configured to output a first signal indicative of the presence of the fluid proximate first specific ones of the first plurality of sensing electrodes and the second plurality of sensing electrodes when the fluid is proximate but does not submerge the first specific ones of the first plurality of sensing electrodes and the second plurality of sensing electrodes based on the difference in the capacitances of the first specific ones of the first plurality of sensing electrodes and the second plurality of sensing electrodes.

3. The apparatus of claim 2 wherein the controller is configured to output a second signal indicative of the presence of the fluid proximate the first specific ones of the first plurality of sensing electrodes and the second plurality of sensing electrodes when the fluid partially submerges the first specific ones of the first plurality of sensing electrodes and the second plurality of sensing electrodes based on the difference in the capacitances of the first specific ones of the first plurality of sensing electrodes and the second plurality of sensing electrodes.

4. The apparatus of claim 3 wherein the controller is configured to output a third signal indicative of the presence of the fluid proximate the first specific ones of the first plurality of sensing electrodes and the second plurality of sensing electrodes when the fluid fully submerges the first specific ones of the first plurality of sensing electrodes and the second plurality of sensing electrodes based on the difference in the capacitances of the first specific ones of the first plurality of sensing electrodes and the second plurality of sensing electrodes.

5. The apparatus of claim 4 wherein the controller is configured to output a fourth signal indicative of the presence of the fluid proximate second specific ones of the first plurality of sensing electrodes and the second plurality of sensing electrodes when the fluid further partially submerges the second specific ones of the first plurality of sensing electrodes and the second plurality of sensing electrodes based on the difference in the capacitances of the second specific ones of the first plurality of sensing electrodes and the second plurality of sensing electrodes.

6. The apparatus of claim 5 wherein the controller is configured to output a fifth signal indicative of the presence of the fluid proximate the second specific ones of the first plurality of sensing electrodes and the second plurality of sensing electrodes when the fluid further fully submerges the second specific ones of the first plurality of sensing electrodes and the second plurality of sensing electrodes based on the difference in the capacitances of the second specific ones of the first plurality of sensing electrodes and the second plurality of sensing electrodes.

7. The apparatus of claim 6 wherein the controller is configured to:
   calculate the slope of a curve connecting the difference between the capacitances of the first specific ones of the first plurality of sensing electrodes and the second plurality of sensing electrodes and the difference between the capacitances of the second specific ones of the first plurality of sensing electrodes and the second plurality of sensing electrodes; and
   determine the extent to which the fluid submerges the second specific ones of the first plurality of sensing electrodes and the second plurality of sensing electrodes based on the slope of the curve.

8. The apparatus of claim 7 wherein the controller is configured to determine the extent to which the fluid submerges the second specific ones of the first plurality of sensing electrodes and the second plurality of sensing electrodes based on an inflection point of the slope of the curve.

9. The apparatus of claim 8 wherein the controller is configured to output a sixth signal indicative of the presence of the fluid proximate third specific ones of the first plurality of sensing electrodes and the second plurality of sensing electrodes when the fluid further partially submerges the third specific ones of the first plurality of sensing electrodes and the second plurality of sensing electrodes based on the difference in the capacitances of the third specific ones of the first plurality of sensing electrodes and the second plurality of sensing electrodes.

10. The apparatus of claim 5 wherein the controller is configured to output a seventh signal indicative of the presence of the fluid proximate the third specific ones of the first plurality of sensing electrodes and the second plurality of sensing electrodes when the fluid further fully submerges the third specific ones of the first plurality of sensing electrodes and the second plurality of sensing electrodes based on the difference in the capacitances of the third specific ones of the first plurality of sensing electrodes and the second plurality of sensing electrodes.

11. The apparatus of claim 10 wherein the controller is configured to output an alarm if the differences in the capacitances of the first specific ones of the first plurality of sensing electrodes and the second plurality of sensing electrodes and the differences in the capacitances of the third specific ones of the first plurality of sensing electrodes and the second plurality of sensing electrodes exceed the differences in the capacitances of the second specific ones of the first plurality of sensing electrodes and the second plurality of sensing electrodes by at least a predetermined threshold.

12. The apparatus of claim 6 wherein the controller is configured to determine the extent to which the fluid submerges the second specific ones of the first plurality of sensing electrodes and the second plurality of sensing electrodes based on the formula $$\text{Level (in Percent)} = \frac{(Avg_{Fluid} - Avg_{Sensor}) * 100}{(Avg_{Fluid} - Avg_{no\text{-}fluid})}$$

where $Avg_{fluid}$=the average capacitance of ones of the first plurality of sensing electrodes exhibiting capacitance indicative of the ones of the first plurality of sensing electrodes being submerged or nearly submerged, where $Avg_{Sensor}$=the average capacitance of all of the first plurality of sensing electrodes, and wherein $Avg_{no\text{-}fluid}$=the average capacitance of ones of the first plurality of sensing electrodes exhibiting capacitance indicative of the ones of the first plurality of sensing electrodes being unsubmerged or nearly unsubmerged.

13. The apparatus of claim 12 disposed in or on the wall of the vessel wherein the level determined by the controller is representative of the level of the liquid within the vessel.

14. The apparatus of claim 1 wherein each of the first plurality of sensing electrodes is arranged in a linear array having a first end and a second end.

15. The apparatus of claim 14 wherein every line perpendicular to the linear array and between the first end and the second end of the linear array passes through at least one of the first plurality of sensing electrodes.

16. The apparatus of claim 1 disposed in or on the wall of the vessel, wherein the signal indicative of the presence or absence of a liquid is representative of the level of the liquid within the vessel.

17. The apparatus of claim 1 wherein the controller further is configured to energize the first plurality of sensing electrodes while sampling the second plurality of sensing electrodes.

* * * * *

UNITED STATES PATENT AND TRADEMARK OFFICE
CERTIFICATE OF CORRECTION

PATENT NO. : 10,371,555 B2
APPLICATION NO. : 15/655444
DATED : August 6, 2019
INVENTOR(S) : Randall Philipson It is certified that error appears in the above-identified patent and that said Letters Patent is hereby corrected as shown below:

In the Claims

Column 9, Claim 2, Line 38, should read as follows:
--of the liquid proximate first specific ones of the first plurality--

Column 9, Claim 2, Line 40, should read as follows:
--electrodes when the liquid is proximate but does not submerge--

Column 9, Claim 3, Line 48, should read as follows:
--presence of the liquid proximate the first specific ones of the--

Column 9, Claim 3, Line 50, should read as follows:
--of sensing electrodes when the liquid partially submerges the--

Column 9, Claim 4, Line 58, should read as follows:
--of the liquid proximate the first specific ones of the first--

Column 9, Claim 4, Line 60, should read as follows:
--sensing electrodes when the liquid fully submerges the first--

Column 10, Claim 5, Line 1, should read as follows:
--presence of the liquid proximate second specific ones of the first--

Column 10, Claim 5, Line 3, should read as follows:
--sensing electrodes when the liquid further partially submerges--

Column 10, Claim 6, Line 11, should read as follows:
--of the liquid proximate the second specific ones of the first--

Signed and Sealed this
Twenty-second Day of October, 2019

Andrei Iancu
*Director of the United States Patent and Trademark Office*

CERTIFICATE OF CORRECTION (continued)
U.S. Pat. No. 10,371,555 B2

Column 10, Claim 6, Line 13, should read as follows:
--sensing electrodes when the liquid further fully submerges the--

Column 10, Claim 7, Line 28, should read as follows:
--determine the extent to which the liquid submerges the--

Column 10, Claim 8, Line 34, should read as follows:
--configured to determine the extent to which the liquid submerges--

Column 10, Claim 9, Line 40, should read as follows:
--of the liquid proximate third specific ones of the first plurality--

Column 10, Claim 9, Line 42, should read as follows:
--electrodes when the liquid further partially submerges the--

Column 10, Claim 10, Line 50, should read as follows:
--presence of the liquid proximate the third specific ones of the--

Column 10, Claim 10, Line 52, should read as follows:
--of sensing electrodes when the liquid further fully submerges--

Column 11, Claim 2, Line 2, should read as follows:
--configured to determine the extent to which the liquid submerges--